US005980237A

United States Patent [19]

[11] Patent Number: 5,980,237
[45] Date of Patent: Nov. 9, 1999

Swenson et al.

[54] INJECTION MOLDING NOZZLE

[75] Inventors: Paul M. Swenson, South Hamilton; Michael L. Vasapoli, Gloucester; William J. Hume, West Newbury, all of Mass.

[73] Assignee: Dynisco, Inc., Sharon, Mass.

[21] Appl. No.: 09/163,577

[22] Filed: Sep. 30, 1998

Related U.S. Application Data

[63] Continuation of application No. 08/856,260, May 14, 1997, Pat. No. 5,885,628, which is a continuation of application No. 08/628,535, Apr. 10, 1996, abandoned, which is a continuation-in-part of application No. 08/367,779, Dec. 30, 1994, Pat. No. 5,554,395, which is a continuation of application No. 08/105,799, Aug. 12, 1993, abandoned.

[51] Int. Cl.[6] .................... B29C 45/20
[52] U.S. Cl. .................... 425/549; 425/572
[58] Field of Search .................... 425/572, 549

[56] References Cited

U.S. PATENT DOCUMENTS 4,034,952 7/1977 Stewart .
4,088,271 5/1978 Flygenring .
4,212,626 7/1980 Gellert .
4,344,750 8/1982 Gellert .
4,530,654 7/1985 Rose .
4,705,473 11/1987 Schmidt .
4,726,751 2/1988 Shibata .
4,832,593 5/1989 Brown .
4,900,560 2/1990 Trakas .
4,925,384 5/1990 Manner .
4,981,431 1/1991 Schmidt .
5,118,279 6/1992 Gellert .
5,135,377 8/1992 Gellert .
5,139,724 8/1992 Hofstetter et al. .
5,208,052 5/1993 Schmidt et al. .
5,254,305 10/1993 Fernandez et al. .
5,268,184 12/1993 Gellert .
5,269,676 12/1993 Gellert .
5,299,928 4/1994 Gellert .
5,318,434 6/1994 Gellert .
5,324,191 6/1994 Schmidt .
5,326,251 7/1994 Gellert .
5,334,008 8/1994 Gellert .
5,346,388 9/1994 Gellert .
5,443,381 8/1995 Gellert .
5,492,467 2/1996 Hume et al. .
5,545,028 8/1996 Hume et al. .
5,554,395 9/1996 Hume et al. .
5,674,439 10/1997 Hume et al. .
5,820,899 10/1998 Gellert et al. .

FOREIGN PATENT DOCUMENTS 0 842 751 A2 5/1998 European Pat. Off. .

OTHER PUBLICATIONS

Machines, Processing and Application, W. Hartmann, pp. 9–15.

"Thermoplay®"—Directly Heated Thermoconducting Nozzle with Universal Applications, W. Hartmann, pp. 1–8.

Optimization of Thermal Economy from Hot Channel Nozzles, R. Löhl, pp. 1–8.

Thermoplay Nozzles for hot runner—Enrietti System.

An account of activity by Kona corporation including sketches by P. Swenson, dated Aug. 25, 1994 & Mar. 15, 1995.

*Primary Examiner*—Tim Heitbrink
*Attorney, Agent, or Firm*—Wolf, Greenfield & Sacks, P.C.

[57] ABSTRACT

An injection molding nozzle for disposition in a mold. The nozzle is for injecting melt into a cavity of the mold, and includes a body having a through bore extending therethrough for receiving the melt. Attached to the body of the nozzle is a nozzle piece secured to the body that defines an outlet communicating between the body through bore and the cavity gate. A nozzle member surrounds the body at a position upstream of the nozzle piece and has an inner surface contacting the body, and an outer surface contacting the mold. The outer surface forms a seal against melt flow upstream from the nozzle member.

19 Claims, 5 Drawing Sheets

INJECTION MOLDING NOZZLE

This application is a continuation of application Ser. No. 08/856,260, filed May 14, 1997, now U.S. Pat. No. 5,885,628 entitled INJECTION MOLDING NOZZLE, which is a continuation of Ser. No. 08/628,535, filed Apr. 10, 1996, now abandoned, which is a continuation-in-part of Ser. No. 08/367,779, filed Dec. 30, 1994, now U.S. Pat. No. 5,554,395, issued Sep. 10, 1996, which is a continuation of Ser. No. 105,799 filed Aug. 12, 1993, now abandoned.

BACKGROUND OF THE INVENTION

1. Field of the Invention

The present invention relates in general to nozzles for use in an injection molding system. More particularly, the present invention relates to an improved injection molding nozzle characterized in particular by minimal heat loss characteristics and an improved sealing technique.

2. Discussion of the Related Art

A common problem in the field of injection molding is the need to keep the melt that forms the molded article at a uniform temperature as it passes from a plastic melt source through an injection nozzle and into a cavity in the cooled mold. The melt is uniformly kept at its optimum melting point in order to assure a good melt flow. The optimum temperature is the temperature at which no melt freeze-off or burning occurs.

Usually, a bore is formed in the cooled mold in which the nozzle is seated. The mold is often several times cooler than the melt, thus, in order to keep the melt at its optimum flowing temperature, the nozzle is heated by heating coils, heat pipes, electric resistance heaters, or other appropriate heating means. As the nozzle is surrounded by the cooled mold, significant heat loss can occur between the nozzle and the mold which can affect the temperature of the melt. Further, the heat transfer from the nozzle to the mold can affect the solidifying times of the molded article in the cavity within the mold. Accordingly, there is a need to provide effective insulation of the nozzle within the mold to minimize heat loss from the nozzle to the mold.

In view of the foregoing, it is an object of the present invention to provide improved insulation of a nozzle for an injection molding machine, in order to minimize heat loss that occurs from the heated nozzle to the cooled mold.

Another object of the present invention is to provide an improved nozzle seal that provides, not only the aforementioned heat insulation characteristics, but also a simple and effective seal against melt leakage from the gate.

SUMMARY OF THE INVENTION

The present invention relates to an injection molding nozzle that is adapted to be disposed in a mold. The nozzle is for injecting melt into a cavity of the mold. The nozzle comprises a body including a main section having a through bore extending through the body and for the introduction of the melt. A nozzle piece is disposed at the end of the body. The nozzle piece is secured to the body and defines an outlet communicating between the through bore of the body and the cavity gate. A nozzle member is provided for the purpose of sealing against melt flow as well as for providing thermal insulation between the nozzle body and the mold. The nozzle member surrounds the body at a position upstream of the nozzle piece, has an inner surface contacting the body, and an outer surface contacting the mold. The outer contacting surface forms a seal preventing melt flow about the nozzle body.

In one preferred embodiment of the present invention disclosed herein, the nozzle member is an annular member constructed of a heat insulating material and has a length measured in the direction of melt flow through the through bore that is greater than the width of the annular nozzle member. The nozzle member also preferably defines air gaps on either side thereof between the nozzle member and the respective nozzle body and mold. In the embodiment disclosed herein, the nozzle member also includes a separately disposed annular seal formed in a cavity of the annular nozzle member.

Other embodiments of the present invention described herein include an embodiment in which the nozzle piece is arranged to extend radially of the longitudinal through bore in the body main section. A single nozzle piece can be employed or, in other embodiments, multiple nozzle pieces are described arranged in a radial pattern.

In accordance with another aspect of the present invention, the nozzle piece is constructed to include an outer piece of annular construction and disposed about the outlet of the nozzle piece and similarly about the cavity gate. This outer piece does not form a seal to the melt but instead is disposed with a small gap so as to provide further heat insulation characteristics.

DETAILED DESCRIPTION

Figure 1:
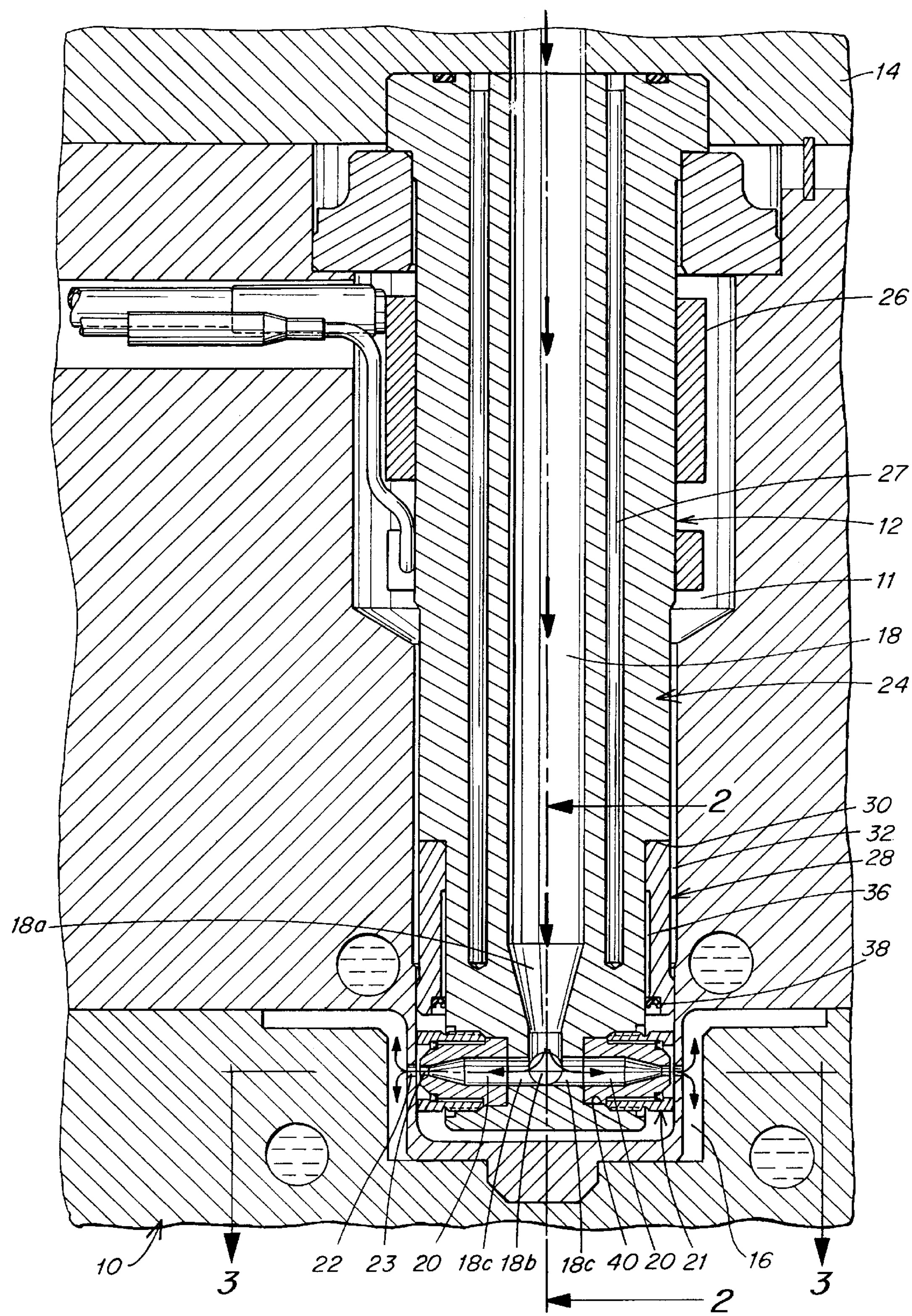
FIG. 1 is a cross-section view of the injection nozzle according to one embodiment of the present invention.

The present invention relates to a nozzle for use in an injection molding system. FIG. 1 shows a cutaway of an injection mold system used to form molded articles. The system shown utilizes one embodiment of a nozzle 12 according the present invention. The system includes three main parts, a cooled mold 10, the nozzle 12, and a heated manifold 14. Note, the heated manifold can be used when multiple nozzles are used. In an alternate embodiment, when a single nozzle, also called a sprue bushing is used, the nozzle 12 can be directly connected to the injection machine, eliminating the need for the manifold. The cooled mold has a bore 11 in which nozzle 12 is heated. The molded article is formed in a cavity 16 formed within mold 10. To form the molded article, hot melt is injected under pressure from an injection machine (not shown) into heated manifold 14 (if used), through a bore 18 within the nozzle 12. The melt flows through the bore 18, to a section of the bore that narrows 18*a*. The vertical section of bore 18 ends at 18*b* and is distributed to radial passages 18*c*. Radial passages 18*c* lead into recesses 40 which receive nozzle pieces 21. Nozzle pieces 21 have bore passages 20 through which the melt passes, as indicated by the arrows. The melt exits the radial bore passages 20 at opening 23 of nozzle piece 21, and flows into the cavity 16 via a gate 22 of the cavity. The cooled mold 10 causes the melt material which is injected into the cavity to solidify. The molded article when solidified is then ejected from the mold. The nozzle 12 includes a nozzle body 24 which preferably is kept at the temperature of the melt through the use of resistance heaters 26 and heat pipes 27, or other appropriate heating means. The nozzle body can be made of stainless steel, 4140 tool steel, or other appropriate material. The bore 11 in the mold has an increased diameter for accommodating resistance heaters 26. Alternatively, the resistance heaters can be embedded in the nozzle, in which case the bore 11 would have a uniform diameter.

Figure 2:
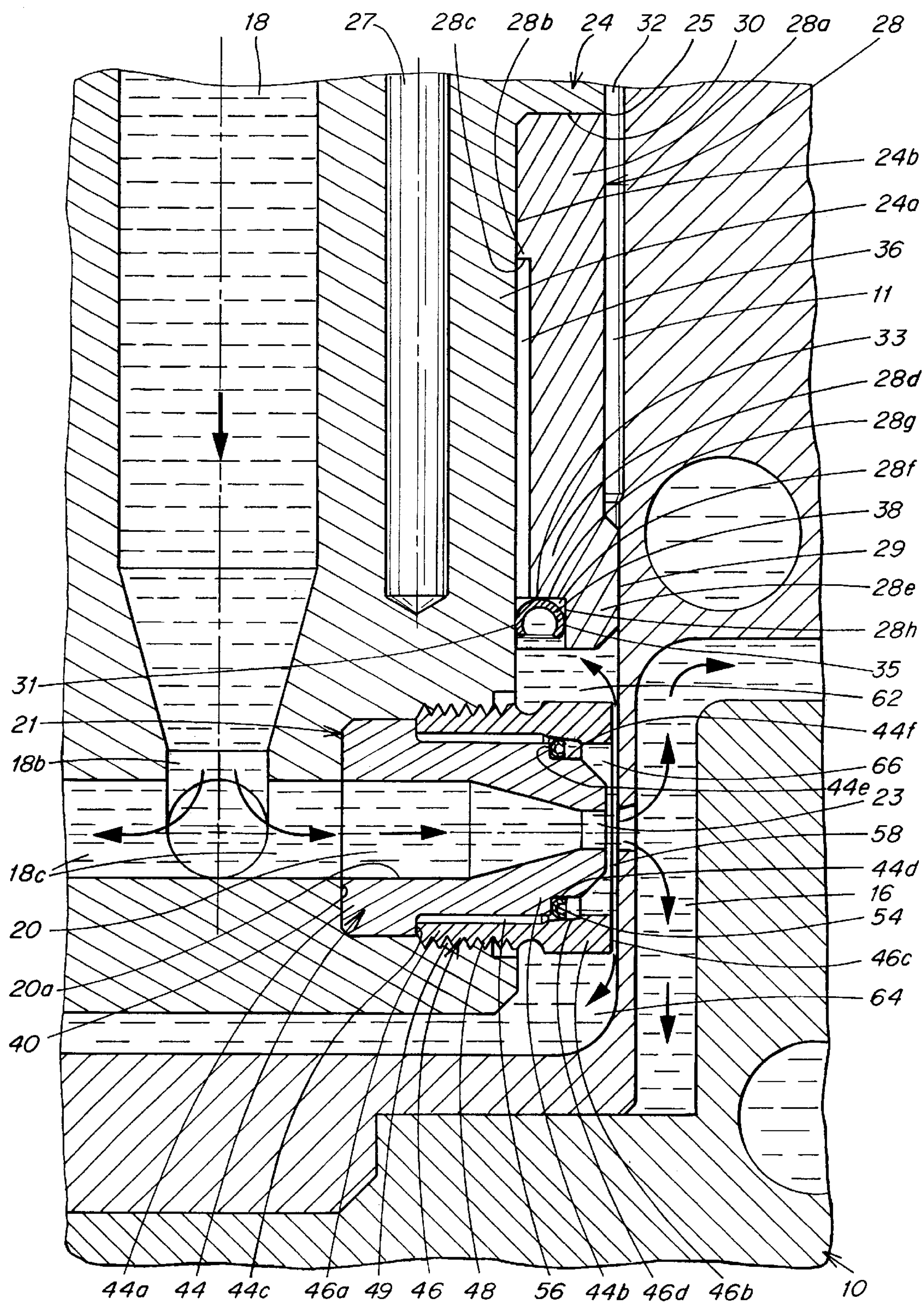
FIG. 2 is an enlarged fragmentary view of a portion of the nozzle showing greater details of the nozzle construction, as taken along line 2—2 of FIG. 1.

Referring to FIG. 2, which is an enlarged fragmentary view of a portion of the nozzle 12 showing greater details of the nozzle construction, as taken along lines 2—2 of FIG. 1, the nozzle body has a section of reduced diameter 24*a* that defines a shoulder 30. Nozzle member 28 is a sealing sleeve fixedly attached to the nozzle body 24 at shoulder 30 and at a surface 24*b* of reduced diameter section 24*a*. The nozzle member 28 has a top portion 28*a* that is fixedly attached to shoulder 30 and to surface 24*b* of reduced diameter section 24*a*. The nozzle member can be fixedly attached by press fitting it about the nozzle body. In an alternate embodiment, the nozzle member can have a threaded top portion for screwing it on the nozzle body. The top portion 28*a* includes a flange 28*b* defining a shoulder 28*c*, the inner surface of flange 28*b* being attached to surface 24*b* of reduced diameter section 24*a*. The nozzle member is constructed so that its outer surface is flush with the nozzle body 24 to create a smooth surface 25 where the nozzle member 28 meets the nozzle body 24. The radius of nozzle body 24 and nozzle member 28 measured from the center of bore 18 is less than the radius of the inner surface of the mold bore 11; thus, an insulating air gap 32 is formed between them. The nozzle member 28 has a lower portion 28*d* that contacts mold 10 to form a seal 29 which seals the air gap 32. Lower portion 28*d* of nozzle member 28 has a flange 28*e* which extends away from nozzle body 24, so as to engage the mold to form the seal 29. The seal 29 formed between the mold 10 and the nozzle member 28 by flange 28*e* functions to prevent melt from escape into air gap 32. The air gap 32 also functions to insulate the nozzle from the mold. Note, flange 28*e* also serves to align the nozzle 12 within the mold bore 11.

The nozzle member 28 can be made of a material having a low thermal conductivity, such as titanium alloy, in order to insulate the nozzle from the cooled mold. Due to the elongated construction of the nozzle member 28, heat loss from where the nozzle body contacts the nozzle member (shoulder 30 and surface 24*b* of the nozzle body) to the cooled mold 10 at seal 29 is minimized, as any heat transfer must proceed from upper portion 28*a* of the nozzle member, down the entire length of the nozzle member 28 to the lower portion 28*d* and flange 28*e* where seal 29 is formed.

The nozzle member 28 also includes a recess 28*f* which defines a shoulder 28*g* and an inner surface 28*h* located in lower portion 28*d* that faces section 24*a* of nozzle body 24. The recess 28*f* is for receiving a seal 38. The seal 38 extends in a ring around the nozzle body 24. In the embodiment shown in FIGS. 1 and 2 the seal is formed in a C-shape. The C-shape minimizes the contact area the seal makes with the nozzle body 24 at contact point 31, and the shoulder 28*g* and inner surface 28*h* at contact points 33 and 35, respectively. Any shape seal may be used which creates minimal contact points with the nozzle body 24 and the nozzle member 28. Minimizing the area of the contact points of the seal minimizes the heat transfer which may pass from the nozzle body 24 through the seal to the lower portion 28*d* of the nozzle member 28 through seal 29 to the mold 10. A second insulating air gap 36, providing further insulation to nozzle body 24, is defined by the nozzle body 24, the nozzle member 28, and seal 38 which prevents melt from escaping into air gap 36. Due to the poor heat transfer characteristics of the seal 38 to the mold, and the elongated construction of the nozzle member 28, heat loss to the mold is minimized, and the melt can be kept at its optimum temperature. To further reduce heat loss, the seal 38 can be made of a thin, resilient metallic substance having low thermal conductivity. Further, resiliency of the seal 38 enables it to be compressibly fit around nozzle body 24, and permits nozzle member 28 to compress the seal inward toward the nozzle to create a good seal.

Still referring to FIG. 2, the nozzle piece 21 will now be described. The nozzle body 24 includes a cup-shaped recess 40 for receiving the nozzle piece 21 having bore passage 20 formed therein. Nozzle piece 21 includes an inner piece 44 which is seated in recess 40 of body 24 of nozzle 12, and an outer piece 46 which surrounds a portion of the inner piece and holds the inner piece in place. The diameter of bore passage 20 formed in inner piece 44 is formed to be the same as the diameter of radial passages 18*c* of the nozzle body 24. Thus, the inner surface 20*a* of the bore passage 20 is flush with the inner surface of radial passage 18*c*. The inner piece includes a first section 44*a* that is seated in recess 40. A second section 44*b* has a lesser diameter than the first section 44*a*. A shoulder 44*c* is defined where the first and second sections meet. The outer piece 46 has a first end 46*a* that is seated on the shoulder 44*c* of the inner piece. The first end 46*a* has threads 48 adapted to mate with threads 49 formed in the recess 40. The second end 46*b* of the outer piece includes a section 46*c* which extends toward the surface of the mold 10.

The inner piece can be constructed of a highly thermally conductive material, such as beryllium copper, in order to maintain the temperature of the melt which passes through opening 23 of inner piece 44. Thus, the heat from the heated nozzle body 24 will conduct to the inner piece 44 to maintain the temperature of the melt passing through the inner piece. The outer piece 46 is preferably formed of a low thermally conductive material, such as titanium alloy, to minimize the heat transfer from the inner piece and the nozzle body 24 to the cooled mold. A seal 54, of similar shape as seal 38 yet having smaller dimensions, together with the inner and outer pieces of the nozzle piece 21 form an insulating air gap 56, which functions to insulate the thermally conductive inner piece 44. This construction minimizes heat loss which occurs from the inner piece 44 to the cooled mold, as although the outer piece 46 is quite close to the cooled mold, the shoulder 44*c* where the inner piece and outer piece contact one another is relatively far away from where the section 46*c* almost contacts the cooled mold. Thus, heat loss must travel from the shoulder 44*c* down the entire length of low thermally conducting piece outer piece 46 to be in proximity with the mold 10.

As stated above, seal 54 can be of a similar shape and material as seal 38. Seal 54 also performs similar functions as seal 38, as the C-shape minimizes contact areas between the inner and outer pieces, and consequently minimizes the heat loss from the inner piece 44 to the outer piece 46 via the seal 54. To accommodate the seal 54 the inner piece 44 includes an annular recess 44*d* in second section 44*b*. The annular recess 44*d* forms a shoulder 44*e* that contacts the seal 54. The seal 54 also has contact points along the inner surface 44*f* of recess 44*d*, and on an inner surface of the second end 46*b* of the outer piece. The inner surface of outer piece 46 tapers inward at 46*d* to the region that contacts the seal 54. To assemble the nozzle piece 21 in the recess 40, the seal is compressibly fit over the inner piece at annular recess 44*d*. Note, the seal 54, like the seal 38, can be made of a resilient material of low thermal conductivity. The inner piece 44 is then placed in recess 40. The outer piece 46 is then screwed in mating threads 48 of the outer piece with threads 49 of the nozzle body 24. When screwing in the outer piece, the inner surface of first end 46*a* passes freely over seal 54. However, when the outer piece is screwed in to the point where tapered section 46*d*, which is of a lesser diameter than the inner surface of the first end 46*a*, engages the seal, the seal is compressed inward to create good scaling contact with the inner surface 46*d* tapered section.

When nozzle piece 21 is assembled in recess 40 of nozzle body 24, a small gap 58, such as in the order of 0.001 inches, is present between the section 46*c* of the outer piece 46 and the mold 10. The gap can range from 0.0005 to 0.003 inches. Thus, when melt is injected into the cavity 16, the compressive force will force the melt to escape through gap 58 into spaces 62 and 64 as indicated by the arrows. The melt will act as an insulator between the nozzle and the mold in these spaces. The melt, however, is prevented from escaping into insulating air gaps 36 and 56 by annular seals 38 and 54, respectively. The proximity of section 46*c* to the mold prevents the melt in spaces 62 and 64 from re-entering the area 66 and possibly mixing with a new injection melt. This is significant as the melt in spaces 62 and 64 will degrade over time due to the continuous proximity to the hot nozzle 12 and the cooled mold 10. Thus, it is undesirable to have the melt from these spaces mix with virgin melt, or possibly a melt of a different color. Due to the shape of the outer piece 46, the area 66 from which old melt can mix with new melt is minimal.

The existence of gap 58 advantageously permits less precision when manufacturing nozzle piece 21, than would be necessary if, for example, the nozzle piece was dimensioned to contact the mold. As previously stated, the gap can range from 0.0005 to 0.003 inches. If manufactured to contact the mold, no such range would be permitted and the tolerances of the nozzle piece would be extremely low. The gap 58 is a "hot" gap, that is, the width of the gap will be in the desired range when the nozzle body and nozzle piece expand due to the heat. Thus, the temperature difference between the nozzle and the mold dictate how much the nozzle body and nozzle piece will expand, and the tolerances of the dimensions of the nozzle piece can be accordingly set.

Figure 3:
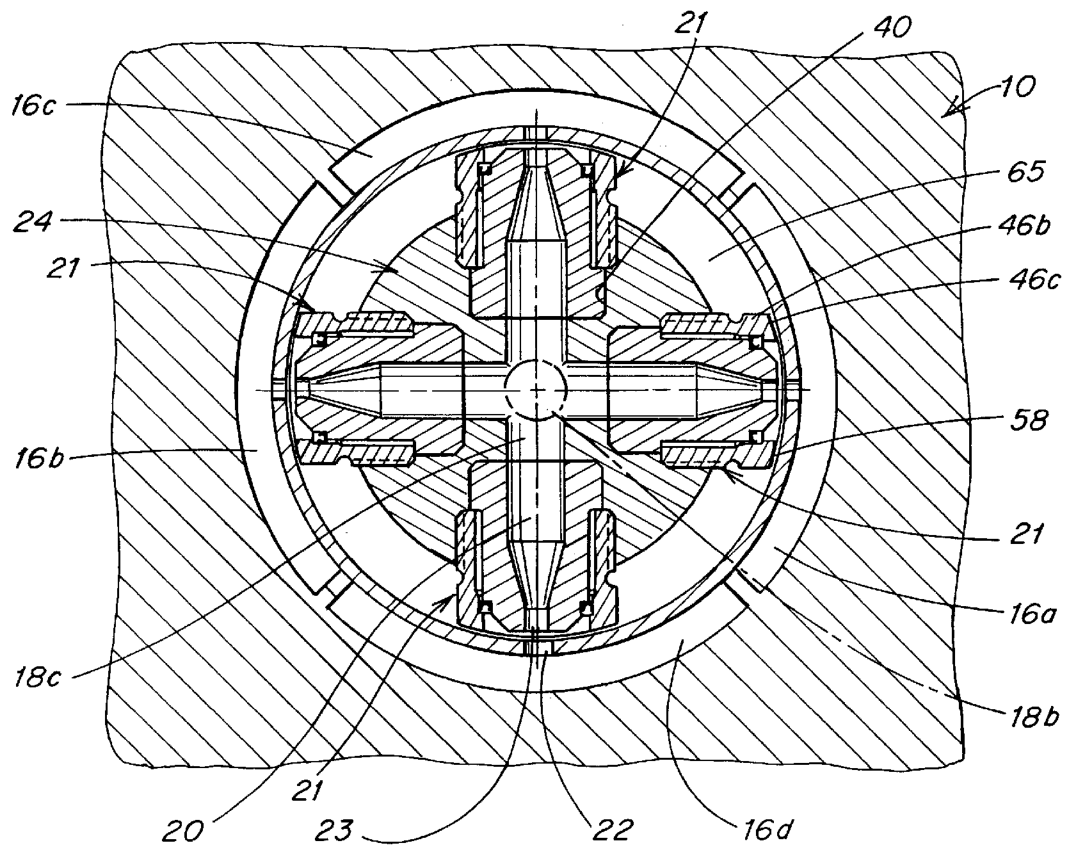
FIG. 3 is a cross-sectional view of the nozzle construction as taken along line 3—3 of FIG. 1.

FIG. 3 is a cross sectional view of the nozzle construction as taken along line 3—3 of FIG. 1. Four nozzle pieces 21 are shown in this embodiment. Bore section 18*b* is shown from which melt is distributed through radial passages 18*c* to bore passages 20 of the nozzle pieces. In operation, the melt proceeds out the opening 23 of the nozzle pieces, through the gate 22, and into the respective mold cavity 16*a*–16*d*. A space 65 is present between each nozzle piece 21. The space 65 will fill with melt that escapes through gap 58, in the same manner that spaces 62 and 64 of FIG. 2 fill with melt. Space 62 and 64, not shown in FIG. 3, are above and below the nozzle pieces 21, respectively. As in spaces 62 and 64, the melt again functions to insulate the nozzle body 24 from the mold. Gap 58 is uniformly distanced from the section 44*c*, to the mold 10. To achieve the uniform distance across the entire gap 58 the section 44*c* must be curved to adapt to the inner circumference of the mold 10.

Figure 4:
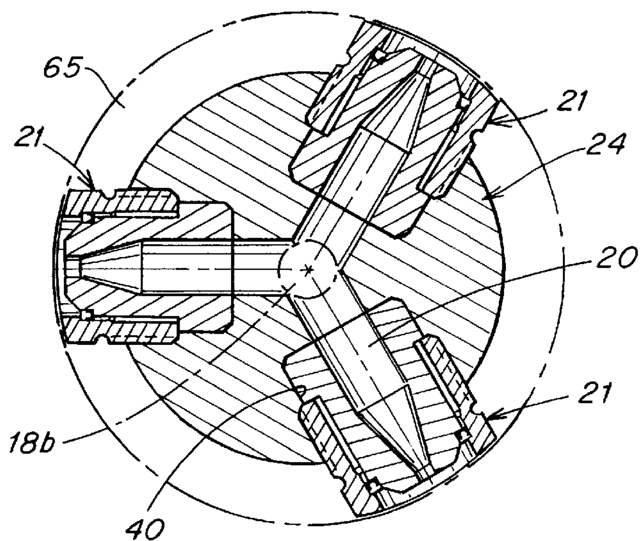
FIGS. 4–6 are cross-sectional views similar to that shown in FIG. 3 for but alternate embodiments using different numbers of nozzles.

FIG. 4 shows a cross sectional view similar to the cross-sectional view of FIG. 3, of an alternative nozzle construction as taken along the same lines as FIG. 3. The nozzle body 24 in FIG. 4 is formed with three recesses 40, as opposed to four in FIGS. 1–3, for receiving the nozzle pieces 21. Thus, melt is distributed from bore section 18*b* to three bore passages 20 of the nozzle pieces 21. The construction of the nozzle pieces 21 in FIG. 4 is the same as in FIGS. 1–3.

Figure 5:
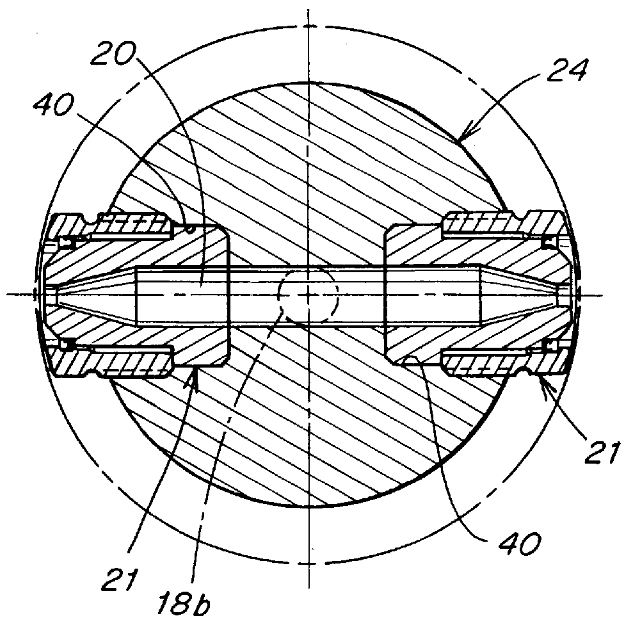

FIG. 5 shows a cross sectional view similar to the cross-sectional view of FIG. 3, of an alternative nozzle construction as taken along the same lines as FIG. 3. The nozzle body 24 in FIG. 5 is formed with two recesses 40, as opposed to four in FIGS. 1–3, or three in FIG. 4, for receiving the nozzle pieces 21. Thus, melt is distributed from bore section 18*b* to two bore passages 20 of the nozzle pieces 21. The construction of the nozzle pieces 21 in FIG. 4 is substantially the same as in FIGS. 1–3.

Figure 6:
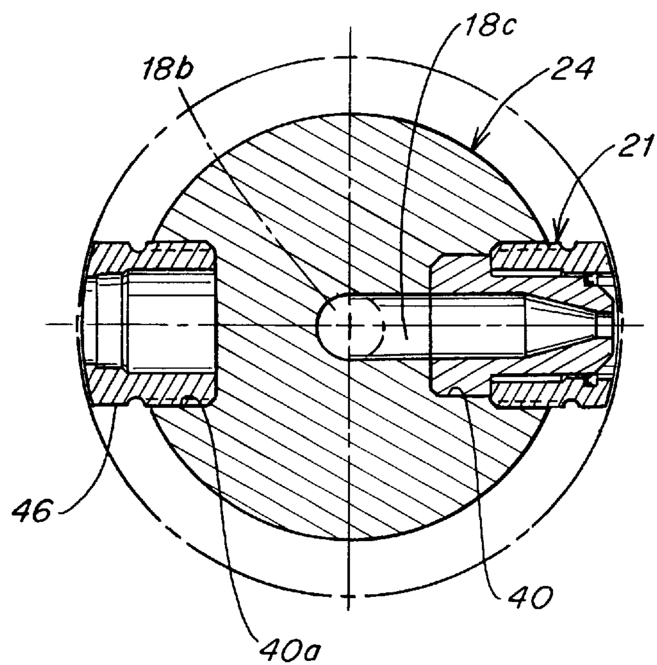

FIG. 6 shows a cross sectional view similar to the cross-sectional view of FIG. 3, of an alternative nozzle construction as taken along the same lines as FIG. 3. The nozzle body 24 in FIG. 4 is formed with two recesses 40, as opposed to four in FIGS. 1–3, or three in FIG. 4, for receiving the nozzle pieces 21. Although there are two recesses 40, only one bore section 18*c* of nozzle body 24 is formed to connect with one recess 40. Thus, bore section 18*b* distributes melt to only one bore passage 20 of the nozzle piece 21. The construction of the nozzle piece 21 in FIG. 4 is substantially the same as in FIGS. 1–3. Note, outer piece 46*a* is still screwed into recess 40*a*, in order to limit lateral deflection of the nozzle 12 which occurs when melt is shot out of single nozzle piece 21. Deflection is limited when the nozzle piece 40*a* contacts the mold. The configurations of FIGS. 3–5 do not have a nozzle deflection problem as the force of the melt shots are balanced off by one another. As there is only a single nozzle piece used in FIG. 6, the radial arrangement of the bore section 18*c* can be substituted with a vertical arrangement having a nozzle piece that points straight down, in line with the longitudinal axis of bore 18. Note, in this arrangement the nozzle piece 40*a* is not necessary, as there is no lateral deflection of the nozzle.

Figure 7:
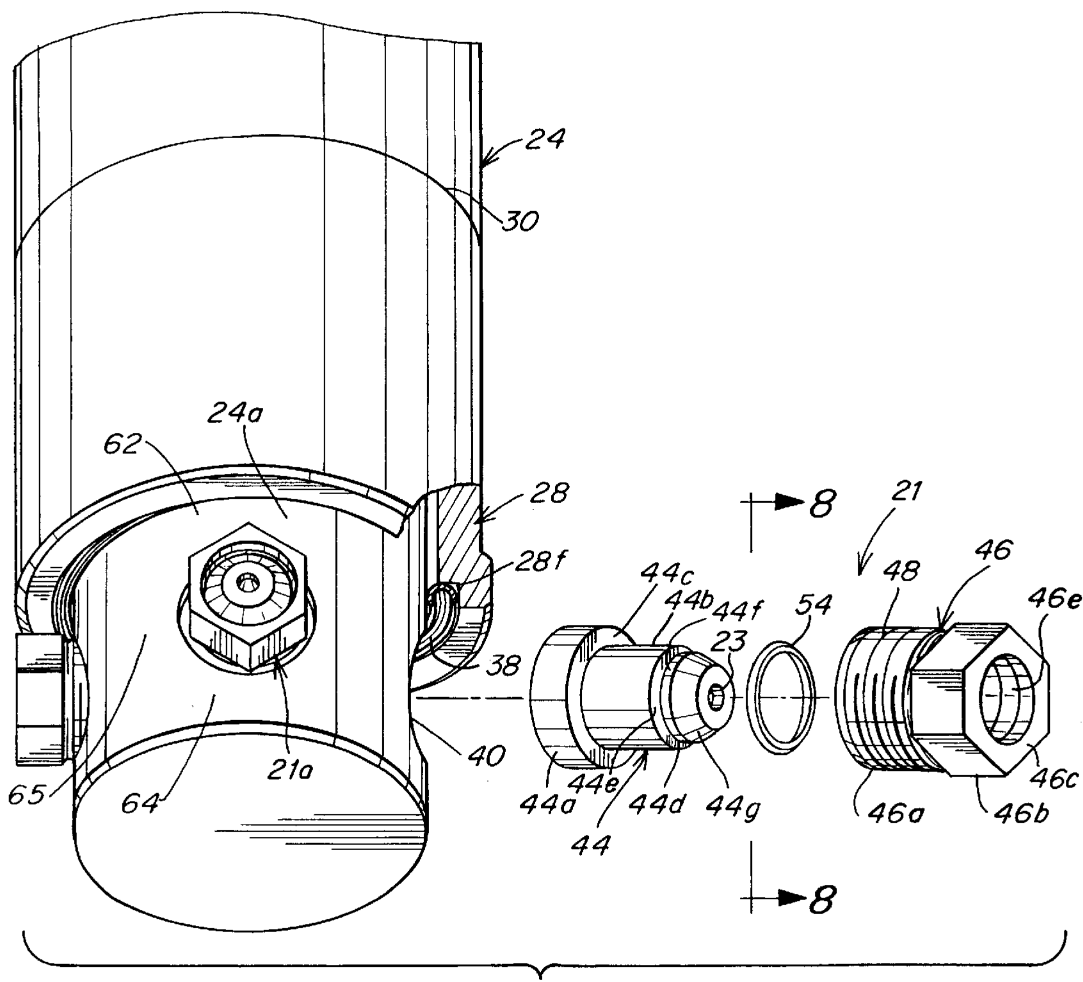
FIG. 7 is an exploded perspective view showing further details of the embodiment of FIG. 1.

FIG. 7 shows an exploded perspective view showing further details of the embodiment of FIG. 1. A cutaway of the nozzle member 28 and seal 38 are shown. The nozzle member 28 is constructed to be flush with the nozzle body 24 where the nozzle member meets the shoulder 30 formed by reduced diameter section 24*a* of the nozzle body 24. The spaces 62, 64 and 65 described in FIGS. 1–6 that surround the nozzle pieces 21 are clearly seen in FIG. 7. Also shown in FIG. 7 is an exploded perspective view of the nozzle piece 21. As stated above, inner piece 44 is to be seated in recess 40 of the nozzle body 24 and includes a first section 44*a*, a second section 44*b* having a lesser diameter than the first section to define a shoulder 44*c* on which the outer piece 46 rests. The seal 54 is compressibly fit over annular recess 44*d* in inner piece 44. The inner piece is tapered at 44*f* to opening 23. The outer piece 46 is shown with first end 46*a* that sits on shoulder 44*c* of the inner piece. Threads 48 are used to fixedly attach the outer nozzle piece to the nozzle body. Second end 46*b* can have a hexagonal shape to facilitate screwing the outer piece into the recess threads 49. The outer piece has a hollow area 46*e* to accept the inner piece 44. Nozzle piece 21*a* is shown in the assembled position attached to the nozzle body 24.

Figure 8:
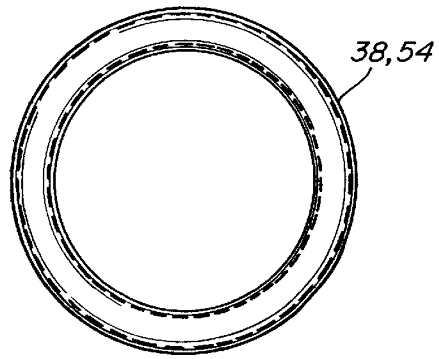
FIG. 8 is a plan view of a C-shaped sealing member used in the embodiment of FIG. 1.
Figure 9:
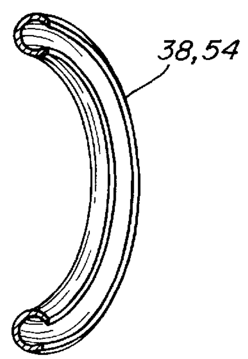
FIG. 9 is a cutaway perspective view showing further details of the scaling member of FIG. 8.

FIG. 8 is a plan view of the C-shape sealing member used in the embodiment of FIGS. 1–7 as taken along line 8—8 of FIG. 7. FIG. 9 is a cutaway perspective view showing further details of the sealing member of FIG. 8. FIGS. 8 and 9 represent the shape of both seals 38 and 54. When assembled, annular seals 54 and 38 are compressibly fit over inner piece 44 and nozzle body 24, respectively. The seal can be made of a resilient metallic material having low thermal conductivity. As seen in FIGS. 8 and 9, the seal has a C-shape, however, any seal of a shape that will minimize contact area with the nozzle body 24 and nozzle member 28 (for seal 38), and the inner and outer pieces of the nozzle piece 21 (for seal 54), is satisfactory.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereof.

What is claimed is:

1. An injection molding apparatus for injecting melt material through a gate and into a cavity within a mold, the apparatus comprising:

- a nozzle body having a bore extending therethrough for receiving the melt material; and
- a plurality of nozzle pieces secured to the nozzle body, each nozzle piece defining an outlet for communicating between the bore of the nozzle body and the gate, and each nozzle piece being dimensioned relative to the mold to define a gap extending along an entireinterface between the nozzle piece and the mold when melt material is injected through the gate.

2. The apparatus of claim 1, wherein each nozzle piece is hollow and includes a central bore passage that communicates with the bore of the nozzle body.

3. The apparatus of claim 1, further comprising a nozzle member secured to the nozzle body that surrounds the nozzle body at a position upstream of said plurality of nozzle pieces and having an inner surface contacting the nozzle body and an outer surface for contacting and forming a seal with the mold.

4. The injection molding apparatus according to claim 1, wherein each nozzle piece includes an end to form the interface with the mold, the end including a circumferential portion that extends beyond a central portion of the end.

5. An injection molding apparatus for injecting melt material through a gate and into a cavity within a mold, the apparatus comprising:

- a nozzle body having a bore extending therethrough for receiving the melt material; and
- at least one nozzle piece secured to the body defining an outlet for communicating between the bore of the nozzle body and the gate, wherein the at least one nozzle piece includes an outermost end, together, with said mold, for defining a gap that surrounds the gate of the cavity, wherein when melt material is injected from said injection molding apparatus into the cavity, the melt passes through the gap into a space defined by an outer surface of the nozzle body and the mold.

6. The apparatus of claim 5, wherein the at least one nozzle piece is hollow and includes a central bore passage that communicates with the bore of the nozzle body.

7. The apparatus of claim 5, further comprising a nozzle member secured to the nozzle body that surrounds the nozzle body at a position upstream of said at least one nozzle piece and having an inner surface contacting the nozzle body and an outer surface for contacting and forming a seal with the mold.

8. The injection molding apparatus according to claim 5, wherein the outermost end of the at least one nozzle piece includes a circumferential portion that extends beyond a central portion of the end of the at least one nozzle piece.

9. An injection molding apparatus for injecting melt material through a gate and into a cavity within a mold, the apparatus comprising:

- a nozzle body having a bore extending therethrough for receiving the melt material; and
- a plurality of nozzle pieces secured to the nozzle body, each nozzle piece defining an outlet for communicating between the bore of the nozzle body and the gate, wherein each nozzle piece is constructed so that there is an absence of direct contact between the nozzle piece and the mold when melt is injected through the gate.

10. The injection molding apparatus of claim 9, each nozzle piece is hollow and includes a central bore passage that communicates with the bore of the nozzle body.

11. The injection molding apparatus of claim 9, further comprising a nozzle member secured about the nozzle body for contacting and sealing with the mold.

12. The injection molding apparatus of claim 9, wherein each nozzle piece includes an end to face the mold, the end including a circumferential portion that extends beyond a central portion of the end.

13. In an edge gated injection molding apparatus having at least one heated nozzle extending forwardly into a well in a cooled mold with an insulative space extending between at least part of the nozzle and the surrounding cooled mold, the well in the mold having a well with a plurality of edge gates spaced therearound, each edge gate extending outwardly to a cavity in the mold, the at least one nozzle having a rear end, a front end, a melt channel, and a plurality of outwardly open seats adjacent the front end of the nozzle, each seat being radially aligned with one of the edge gates, the melt channel having a central portion extending from an inlet at the rear end of the nozzle toward the front end of the nozzle, the melt channel further having a plurality of radial portions, each radial portion branching outwardly from the central portion to one of the outwardly open seats so as to communicate with one of the edge gates, the improvement further comprising:

- the combination of a sealing ring and a plurality of edge gate inserts, the sealing ring having a predetermined inside diameter and extending around the nozzle rearwardly from the outwardly open seats to seal a front portion of the space between the nozzle and the surrounding cooled mold against leakage of melt from said portion of said space, and each of the gate inserts being seated in one of the outwardly open seats spaced around the cylindrical portion of the nozzle, each gate insert having an inner end, an outer end, and a central bore extending therethrough from the inner end to the outer end of the gate insert, the central bore through the gate insert meeting one of the radial portions of the melt channel through the nozzle and extending in alignment with one of the edge gates leading to said cavity in said mold to convey a stream of melt therethrough during injection, the outer end of each gate insert extending outwardly past said inside diameter of the sealing ring, the outer end of each gate insert also being spaced a predetermined distance from the wall of the well in the mold to form an opening therebetween, the opening being large enough to allow pressurized melt to flow therethrough and at least partially to solidify in the sealed front portion of the space between the nozzle and the surrounding cooled mold during the initial injection cycle and small enough to prevent the partially solidified melt in the sealed front portion of the space being sucked back into the melt stream during subsequent injection cycles.

14. An injection molding apparatus for injecting melt material through a gate and into a cavity within a mold, the apparatus comprising:

a nozzle body having a bore extending therethrough for receiving the melt material; and a gate insert secured to the nozzle body, an outer end of the gate insert extending outwardly from the nozzle body toward the mold, the outer end of the gate insert spaced a predetermined distance from the mold to form an opening therebetween, the opening being large enough to allow pressurized melt to flow therethrough and at least partially to solidify in a space between the nozzle and the mold during the initial injection cycle and small enough to prevent the partially solidified melt in the space being sucked back into the melt stream during subsequent injection cycles.

15. The injection molding apparatus of claim 14, wherein the outer end of the gate insert includes a circumferential portion that extends beyond a central portion of the end of the gate insert.

16. An injection molding apparatus for injecting melt material through a gate and into a cavity within a mold, the apparatus comprising:

a nozzle body having a bore extending therethrough for receiving the melt material; and at least one nozzle piece secured to the nozzle body, the at least one nozzle piece defining an outlet for communicating between the bore of the nozzle body and the gate, and the at least one nozzle piece being dimensioned relative to the mold to define a gap extending along an entire interface between the at least one nozzle piece and the mold when melt material is injected through the gate.

17. The injection molding apparatus according to claim 16, wherein the at least one nozzle piece includes an end to form the interface with the mold, the end including a circumferential portion that extends beyond a central portion of the end.

18. An injection molding apparatus for injecting melt material through a gate and into a cavity within a mold, the apparatus comprising:

a nozzle body having a bore extending therethrough for receiving the melt material; and at least one nozzle piece secured to the nozzle body, the at least one nozzle piece defining an outlet for communicating between the bore of the nozzle body and the gate, wherein the at least one nozzle piece is constructed so that there is an absence of direct contact between the at least one nozzle piece aid the mold when melt is injected through the gate.

19. The injection molding apparatus of claim 18, wherein the at least one nozzle piece includes an end to face the mold, the end including a circumferential portion that extends beyond a central portion of the end.

* * * * *